United States Patent Office 3,478,456
Patented Nov. 18, 1969

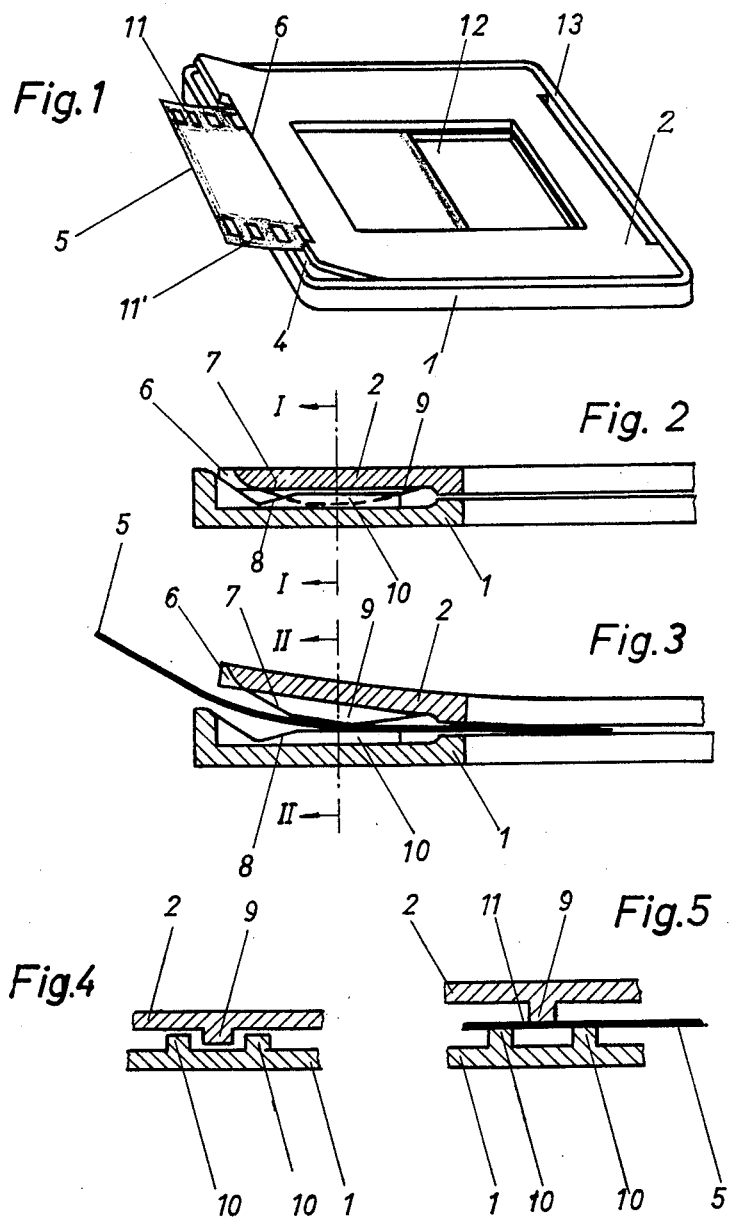

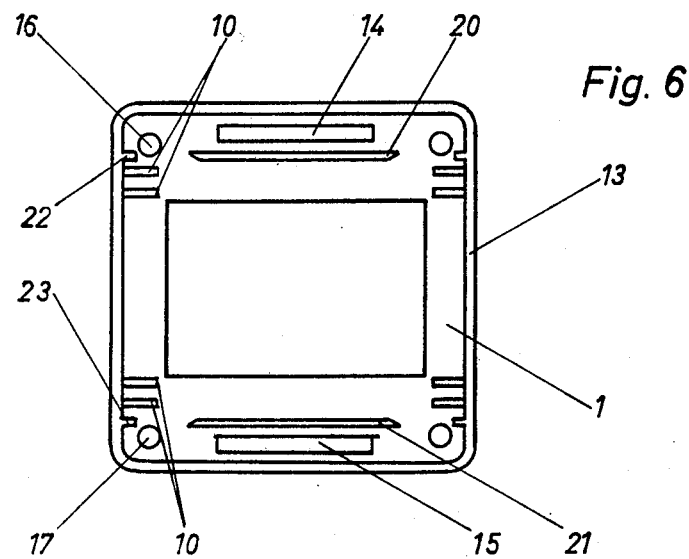
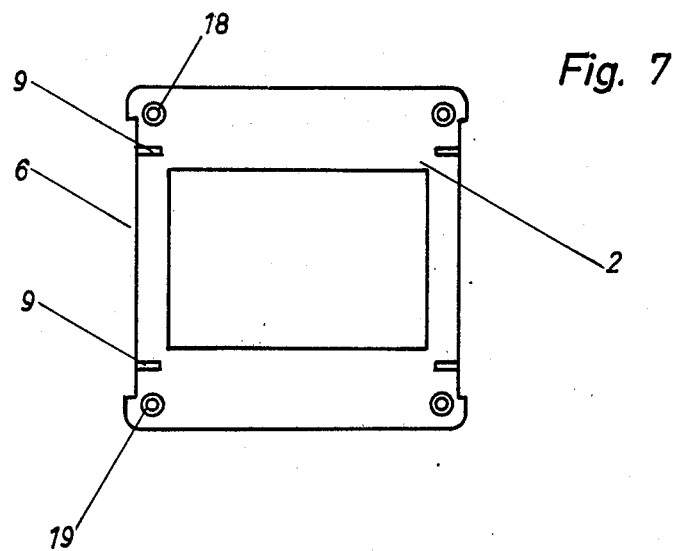

3,478,456
UNITARY SLIDE FRAME
Peter Mundt, Garmisch-Partenkirchen, and Otfried Urban, Kochel am See, Germany, assignors to Geimuplast Peter Mundt KG, Farchant, Germany
Filed Apr. 22, 1968, Ser. No. 723,198
Claims priority, application Germany, Apr. 27, 1967, G 49,947
Int. Cl. G09f 1/12, 13/10
U.S. Cl. 40—152
6 Claims

ABSTRACT OF THE DISCLOSURE

This invention relates to a unitary slide frame consisting of plastics material, preferably free of glass, and having at least one resiliently expandable, lateral insertion slot. A relatively thin cover is connected to the other part of the frame at a distance from the insertion slot and both frame edge portions disposed laterally of the path in which the picture portion of the transparency is inserted have run-up ramps in the insertion path within the slot so that the transparency lifts the cover and thus widens the insertion slot while the transparency is being inserted.

---

This invention relates to a unitary slide frame which consists of plastics material and is preferably free of glass and has at least one resiliently expandable, lateral insertion slot. In this connection, the term "unitary" is used to describe a slide frame which is unitary at the time of the insertion of a transparency into the frame.

In a known slide frame of this kind, the frame edge portions disposed laterally of the path in which the transparency is inserted are so designed adjacent to the insertion slot that the latter can be widened by pairs of opposing forces which act on defined points of said specially designed frame edge portions (German patent specification No. 1,214,898). This design allows a widening of a slide frame in a mounting operation performed by a machine.

The object of the present invention is to provide a slide frame which can be widened for a manual mounting or interchange of transparencies in such a manner that the transparency can be inserted into a unitary slide frame without being scratched in its picture portion. This object is novel in that the widening exceeds the limit which is defined by the elasticity of the material. In the prior art, only the elasticity of the material has been utilized for such purposes. For instance, protective covers which contain sheet material, such as identity papers etc., are usually made from plastics material in such a manner that the insertion slot can be widened. It is also known to provide protective coverings which consist of elastic material and serve to hold unprotected transparencies which are mounted in cardboard, plastics material or the like.

In a unitary slide frame constructed according to this invention, a relatively thin cover is connected to the base part of the frame at a distance from the insertion slot and both frame edge portions disposed laterally of the path in which the picture portion of the transparency is inserted have cams in the insertion path within the slot so that the transparency lifts the cover and thus widens the insertion slot while the transparency is being inserted. Thus, the insertion slot of the slide frame according to the invention is widened by the transparency itself but in such a manner that the picture portion of the transparency cannot be scratched because the forces required to widen the slot are applied only by the edge portions of the transparencies, particularly by their perforated margins.

Thus, the invention differs basically from mounts for film sections, which mounts have integral frame portions serving to receive and hold the edges of the film sections. In such mount, adjacent to the picture aperture, a receiving slot adjacent to one frame portion forms a slip-in opening for the film (German utility model 1,815,222). As is understood in the art, a mount of this type cannot be molded as an integral part because the core portion of the mold could not be extracted. In addition, if the frame parts are made separately and integrally joined by welding, heat-sealing, adhering or the like, a scratching of the picture portion of the transparency during its insertion and particularly during an exchange of one transparency for another is inevitable owing to the sharp edges adjacent to the insertion slot. In fact, it is doubtful whether a transparency can be removed at all from the mounting.

It will be understood that the invention may be embodied in combination with a unitary slide frame according to the German Patent 1,214,898 so that such frame permits of a mounting of a transparency by hand or by machine without a scratching of the picture portion.

The manufacture and mounting operations will be facilitated if in accordance with a further feature of the invention, one-half of the base is the mirror image of its other half and similarly one half of the cover is the mirror image of its other half.

Two embodiments of the invention will be described by way of example hereinafter with reference to the drawing, in which FIG. 1 is a perspective view showing a slide frame according to the invention and a transparency which is partly inserted into the frame;

FIG. 2 is a longitudinal sectional view taken through the margin of a transparency in a slide frame as shown in FIG. 1;

FIG. 3 is a longitudinal sectional view similar to FIG. 2 but with the transparency partly inserted;

FIG. 4 shows the slide frame in a sectional view taken on line I—I in FIG. 2;

FIG. 5 is a sectional view taken on line II—II in FIG. 3;

FIG. 6 is a top plan view showing the inside surface of one frame part of another embodiment; and FIG. 7 is a top plan view showing the inside of the cover of said other embodiment.

The untiary slide frame which is shown in the drawings consists of plastics material and is free of glass. It comprises a base 1 and a relatively thin cover 2. As is apparent from FIG. 6, the cover 2 is joined to the base 1, e.g., by welding, only in a portion of the frame parts. To this end, the base 1 is provided at opposite points with junction ribs 14, 15, which extend approximately along one half the length of the inside surface of the frame part 1 and are equidistantly spaced from the lateral edges thereof. The two frame parts 1, 2 remain unconnected in the spaces at either end of ribs 14, 15. The ribs 20, 21 shown in FIG. 6 serve only for a lateral fixation of the transparency.

As is best apparent from FIGS. 6, 7 and 2, 3 the two frame parts which are disposed laterally of the path in which the picture portion of the transparency is inserted have cams 9, 10 within the insertion slot, in the path in which the perforated margins 11, 11' of the transparency are guided. In the embodiment shown in FIGS. 6, 7, the base 1 has two cams 10 on each side and the cover 2 has one cam 9 on each side. When the two parts are joined, the cams 9 extend into the space between the two cams 10 of the base 1.

As is best apparent from FIGS. 2, 3, the cams 10 of the base 1 have bevelled forward edges 8 on the side where the transparency is inserted. The cams 10 have a steep downward slope on the side facing the picture aperture so that they center the transparency 5 in the picture aperture 12. The cams 9 of the cover 2 are bevelled on both sides. The bevelled forward edge is designated 7.

The base 1 has a peripheral edge lip 13 for centering the cover 2. As is apparent from FIGS. 1 and 2, the insertion slot is formed by an aperture 6 in the end face of the cover 2. The latter is rounded adjacent to its aperture 6. This is clearly shown in FIGS. 2 and 3. Scratching will be prevented even if the picture portion of the transparency should unexpectedly engage the cover 2 at one point or another.

In operation, the transparency 5 is inserted into the aperture 6 of the cover 2 of a frame constructed according to the invention. During this insertion, the leading edge of the transparency engages the wedge-shaped surfaces 7, 8 of the cams 9, 10 disposed on both sides. When the transparency 5 is now further pushed ahead, the relatively thin cover 2 is forced into the position which is shown in FIG. 3 about a fulcrum formed by the forward edges of the junction ribs 14, 15. The perforated margins 11, 11′ of the transparency can now pass between the cams 9, 10, as is shown in FIG. 5. A wide insertion slot 4 is thus provided for the transparency 5 and is shown in FIG. 3. When the transparency 5 has been moved completely past the cams 9, 10, that portion of the cover 2 which is near the insertion slot snaps back to the initial position shown in FIG. 2.

It will be desirable if in each frame part one-half thereof is the mirror image of the half opposite to it, as is shown in the drawings. This design facilitates the manufacturing and mounting operations. Into such frame, the transparency can be inserted from either one of the two opposite sides.

In the embodiment shown by way of example in FIGS. 6 and 7, the described features are supplemented by means which enable also a widening of the slide frame by a machine, just as in the frame described in the German Patent 1,214,898. To this end, the frame part 1 has through bores 16, 17 on both sides adjacent to the insertion slot 4 outside of the path in which the transparency 5 is inserted and corresponding cams 18, 19 of the cover 2 enter said bores to define points which may be forced apart by mandrels to automatically widen the insertion slot.

This embodiment is also provided with two ribs 22, 23, which afford a lateral guidance for the films at the beginning of the inserting operation.

What is claimed is:
1. A unitary slide frame which consists of plastics material and is preferably free of glass and has at least one resiliently expandable, lateral insertion slot, characterized in that a relatively thin cover is connected to the other part of the frame at a distance from the insertion slot and both frame edge portions disposed laterally of the path in which the picture portion of the transparency is inserted have cams in the insertion path within the slot so that the transparency lifts the cover and thus widens the insertion slot while the transparency is being inserted.

2. A frame according to claim 1, characterized in that the cams of the frame part have a steep downward slope toward the picture aperture and the cams of the cover are also bevelled toward the picture aperture.

3. A frame according to claim 1 characterized in that one frame part has a peripheral edge lip and the insertion slot is formed by an aperture at the end of the cover.

4. A frame according to claim 1, characterized in that the cover is rounded adjacent to its aperture forming the insertion slot.

5. A frame according to claim 1, in which frame edge portions disposed laterally of the path in which the transparency is inserted are designed so that the insertion slot can be widened by pairs of opposing forces which act on defined points of said specially designed frame edge portions at right angles thereto, characterized in that the frame part has two through bores on opposite sides adjacent to the insertion slot and outside of the path in which the transparency is inserted, and registering cams of the cover enter said bores to define points to be acted upon by forces exerted by respective mandrels for an automatic widening of the insertion slot.

6. A frame according to claim 1, characterized in that both frame parts consist of mirror-symmetrical halves.

References Cited
UNITED STATES PATENTS

| 3,035,364 | 5/1962 | Hoogesteger | 40—152 |
| 3,341,960 | 9/1967 | Florjancic et al. | 40—152 |
| 3,369,338 | 2/1968 | Koeppe et al. | 40—152 |
| 3,381,401 | 5/1968 | Fuller | 40—159 |

EUGENE R. CAPOZIO, Primary Examiner

W. J. CONTRERAS, Assistant Examiner

U.S. Cl. X.R.

40—16